US012779381B2

(12) United States Patent
Jones et al.

(10) Patent No.: US 12,779,381 B2
(45) **Date of Patent: *Nov. 3, 2026**

(54) FILTRATION COMPOSITES

(71) Applicant: Donaldson Company, Inc., Bloomington, MN (US)

(72) Inventors: Derek O. Jones, Andover, MN (US); Klenton T. Willis, Woodbury, MN (US)

(73) Assignee: Donaldson Company, Inc., Bloomington, MN (US)

( * ) Notice: Subject to any disclaimer, the term of this patent is extended or adjusted under 35 U.S.C. 154(b) by 564 days.

This patent is subject to a terminal disclaimer.

(21) Appl. No.: 17/776,799

(22) PCT Filed: Apr. 2, 2021

(86) PCT No.: PCT/US2021/025674
§ 371 (c)(1),
(2) Date: May 13, 2022

(87) PCT Pub. No.: WO2021/203067
PCT Pub. Date: Oct. 7, 2021

(65) Prior Publication Data

US 2023/0021769 A1 Jan. 26, 2023

Related U.S. Application Data

(60) Provisional application No. 63/081,159, filed on Sep. 21, 2020, provisional application No. 63/004,926, filed on Apr. 3, 2020.

(51) Int. Cl.
*B01D 36/02* (2006.01)
*B01D 39/16* (2006.01)
*B01D 39/18* (2006.01)

(52) U.S. Cl.
CPC ......... *B01D 36/02* (2013.01); *B01D 39/1623* (2013.01); *B01D 39/18* (2013.01);
(Continued)

(58) Field of Classification Search
None
See application file for complete search history.

(56) References Cited

U.S. PATENT DOCUMENTS 5,279,731 A 1/1994 Cook et al.
5,554,287 A 9/1996 Beck et al.
(Continued)

FOREIGN PATENT DOCUMENTS

CN 101952210 A 1/2011
CN 102015080 A 4/2011
(Continued)

OTHER PUBLICATIONS

Zhao et al., "Electrospun Bead-on-String Fibers: Useless or Something of Value? Chapter 5," in Novel Aspects of Nanofibers, 2018, pp. 87-102.
(Continued)

*Primary Examiner* — Benjamin L Lebron
*Assistant Examiner* — Eric J Mccullough
(74) *Attorney, Agent, or Firm* — Mueting Raasch Group

(57) ABSTRACT

This disclosure describes a filtration composite that includes multiple layers of filtration media. In some embodiment, the filtration composite is preferably substantially glass-free or glass-free. When the composite is glass-free or substantially glass-free, the composite preferably exhibits capacity and efficiency comparable to or better than similar glass-containing filtration media. The composite includes a first nonwoven filtration medium including bicomponent fibers, efficiency fibers having a fiber diameter in a range of 1 micron to 5 microns, and microfibrillated fiber; an optional second nonwoven filtration medium; and a third nonwoven filtration medium including efficiency fibers having a fiber diameter of at least 0.1 micron and less than 1 micron.

15 Claims, 3 Drawing Sheets

(52) U.S. Cl.
CPC ................ *B01D 2239/0216* (2013.01); *B01D 2239/0618* (2013.01); *B01D 2239/065* (2013.01); *B01D 2239/086* (2013.01); *B01D 2239/1225* (2013.01); *B01D 2239/1233* (2013.01)

(56) References Cited

U.S. PATENT DOCUMENTS

| | | | |
|---|---|---|---|
| 6,165,572 | A | 12/2000 | Kahlbaugh et al. |
| 6,673,136 | B2 | 1/2004 | Gillingham et al. |
| 6,716,274 | B2 | 4/2004 | Gogins et al. |
| 6,743,273 | B2 | 6/2004 | Chung et al. |
| 6,746,517 | B2 | 6/2004 | Benson et al. |
| 6,800,117 | B2 | 10/2004 | Barris et al. |
| 6,875,256 | B2 | 4/2005 | Gillingham et al. |
| 6,924,028 | B2 | 8/2005 | Chung et al. |
| 6,955,775 | B2 | 10/2005 | Chung et al. |
| 7,070,640 | B2 | 7/2006 | Chung et al. |
| 7,090,715 | B2 | 8/2006 | Chung et al. |
| 7,160,451 | B2 | 1/2007 | Hacker et al. |
| 7,238,285 | B2 | 7/2007 | Hacker et al. |
| 7,309,372 | B2 | 12/2007 | Kahlbaugh et al. |
| 7,314,497 | B2 | 1/2008 | Kahlbaugh et al. |
| 7,316,723 | B2 | 1/2008 | Chung et al. |
| 7,318,852 | B2 | 1/2008 | Chung et al. |
| 7,641,055 | B2 | 1/2010 | Ferrer et al. |
| 7,981,336 | B2 | 7/2011 | Pourdeyhimi |
| 7,985,275 | B2 | 7/2011 | Smithies |
| 7,988,860 | B2 | 8/2011 | Kalayci et al. |
| 8,057,567 | B2 | 11/2011 | Webb et al. |
| 8,262,780 | B2 | 9/2012 | Smithies et al. |
| 8,263,214 | B2 | 9/2012 | Kalayci et al. |
| 8,267,681 | B2 | 9/2012 | Gupta et al. |
| 8,268,033 | B2 | 9/2012 | Rogers et al. |
| 8,277,529 | B2 | 10/2012 | Rogers et al. |
| 8,366,797 | B2 | 2/2013 | Chung et al. |
| 8,512,435 | B2 | 8/2013 | Rogers et al. |
| 8,513,431 | B2 | 8/2013 | Annis et al. |
| 8,524,041 | B2 | 9/2013 | Gupta et al. |
| 8,641,796 | B2 | 2/2014 | Rogers et al. |
| 8,673,040 | B2 | 3/2014 | Handley et al. |
| 8,709,139 | B2 | 4/2014 | Veeser et al. |
| 8,721,756 | B2 | 5/2014 | Handley et al. |
| 8,834,610 | B2 | 9/2014 | Lundgren et al. |
| 8,882,876 | B2 | 11/2014 | Battenfeld et al. |
| 8,950,587 | B2 | 2/2015 | Thomson et al. |
| 9,149,748 | B2 | 10/2015 | Nagy et al. |
| 9,149,749 | B2 | 10/2015 | Nagy et al. |
| 9,153,291 | B2 | 10/2015 | Miller, III et al. |
| 9,259,689 | B2 | 2/2016 | Waller, Jr. et al. |
| 9,303,339 | B2 | 4/2016 | Gupta et al. |
| 9,435,056 | B2 | 9/2016 | Shenoy et al. |
| 9,492,775 | B2 | 11/2016 | Amsden et al. |
| 9,511,330 | B2 | 12/2016 | Yu et al. |
| 9,587,328 | B2 | 3/2017 | Shenoy et al. |
| 9,662,600 | B2 | 5/2017 | Parker |
| 9,718,005 | B2 | 8/2017 | Klein et al. |
| 9,795,906 | B2 | 10/2017 | Rogers et al. |
| 9,885,154 | B2 | 2/2018 | Gupta |
| 9,950,284 | B2 | 4/2018 | Thomson et al. |
| 9,987,578 | B2 | 6/2018 | Haberkamp et al. |
| 10,058,808 | B2 | 8/2018 | Haberkamp et al. |
| 10,080,985 | B2 | 9/2018 | Nagy et al. |
| 10,137,394 | B2 | 11/2018 | Tong et al. |
| 10,252,200 | B2 | 4/2019 | Anantharamaiah et al. |
| 10,279,291 | B2 | 5/2019 | Nagy et al. |
| 10,293,288 | B2 | 5/2019 | Chavan et al. |
| 10,316,468 | B2 | 6/2019 | Gupta |
| 10,316,748 | B2 | 6/2019 | Lans |
| 10,343,095 | B2 | 7/2019 | Jaganathan et al. |
| 10,357,729 | B2 | 7/2019 | Parker |
| 10,363,505 | B2 | 7/2019 | Parker |
| 10,391,434 | B2 | 8/2019 | Haberkamp et al. |
| RE47,737 | E | 11/2019 | Kahlbaugh et al. |
| 10,537,837 | B2 | 1/2020 | Haberkamp et al. |
| 10,610,813 | B2 | 4/2020 | Rogers et al. |
| 10,653,979 | B2 | 5/2020 | Barsness et al. |
| 10,953,356 | B2 | 3/2021 | Haberkamp et al. |
| 10,974,182 | B2 | 4/2021 | Schwandt et al. |
| 11,090,590 | B2 | 8/2021 | Nagy et al. |
| 11,123,668 | B2 | 9/2021 | Anantharamaiah et al. |
| 11,167,232 | B2 | 11/2021 | Jaganathan et al. |
| RE49,097 | E | 6/2022 | Kahlbaugh et al. |
| 11,504,663 | B2 | 11/2022 | Rogers et al. |
| 2002/0046656 | A1 | 4/2002 | Benson et al. |
| 2003/0106294 | A1 | 6/2003 | Chung et al. |
| 2003/0164333 | A1 | 9/2003 | Nohren et al. |
| 2004/0116025 | A1 | 6/2004 | Gogins et al. |
| 2004/0116026 | A1 | 6/2004 | Kubose et al. |
| 2004/0180598 | A1 | 9/2004 | Yang et al. |
| 2004/0211160 | A1 | 10/2004 | Rammig et al. |
| 2005/0026526 | A1 | 2/2005 | Verdegan et al. |
| 2005/0160711 | A1 | 7/2005 | Yang |
| 2006/0096263 | A1 | 5/2006 | Kahlbaugh et al. |
| 2006/0096932 | A1 | 5/2006 | Dema et al. |
| 2006/0137317 | A1 | 6/2006 | Bryner et al. |
| 2006/0242933 | A1 | 11/2006 | Webb et al. |
| 2007/0131235 | A1 | 6/2007 | Janikowski et al. |
| 2008/0093778 | A1 | 4/2008 | Johnson et al. |
| 2008/0105626 | A1 | 5/2008 | Jones et al. |
| 2008/0110342 | A1 | 5/2008 | Ensor et al. |
| 2008/0149561 | A1 | 6/2008 | Chu et al. |
| 2008/0160856 | A1 | 7/2008 | Chen et al. |
| 2008/0197077 | A1 | 8/2008 | Swartley et al. |
| 2008/0302242 | A1 | 12/2008 | Schelling et al. |
| 2008/0314010 | A1 | 12/2008 | Smithies et al. |
| 2009/0120868 | A1 | 5/2009 | Huppchen et al. |
| 2009/0221812 | A1 | 9/2009 | Ankerfors et al. |
| 2009/0266759 | A1 | 10/2009 | Green |
| 2009/0272086 | A1 | 11/2009 | Hsiao et al. |
| 2010/0206803 | A1 | 8/2010 | Ward et al. |
| 2010/0282682 | A1 | 11/2010 | Eaton et al. |
| 2010/0307119 | A1 | 12/2010 | Leung et al. |
| 2010/0313753 | A1 | 12/2010 | Calis et al. |
| 2011/0138683 | A1 | 6/2011 | Altamirano et al. |
| 2011/0138685 | A1 | 6/2011 | Kalayci et al. |
| 2011/0174158 | A1 | 7/2011 | Walls et al. |
| 2011/0210059 | A1 | 9/2011 | Green et al. |
| 2011/0232653 | A1 | 9/2011 | Imashiro et al. |
| 2011/0259796 | A1 | 10/2011 | Chen et al. |
| 2012/0043038 | A1 | 2/2012 | Dodd |
| 2012/0137885 | A1 | 6/2012 | Dullaert et al. |
| 2012/0190264 | A1 | 7/2012 | Mahammad et al. |
| 2012/0234748 | A1 | 9/2012 | Little et al. |
| 2013/0068687 | A1 | 3/2013 | Shenoy et al. |
| 2013/0152948 | A1 | 6/2013 | Inagaki et al. |
| 2013/0233789 | A1 | 9/2013 | Parker |
| 2013/0340613 | A1* | 12/2013 | Krupnikov ............. B01D 39/18 264/413 |
| 2014/0014573 | A1 | 1/2014 | Hosoya et al. |
| 2014/0020350 | A1 | 1/2014 | Fu |
| 2014/0043038 | A1 | 2/2014 | Chen et al. |
| 2014/0076797 | A1 | 3/2014 | Jo et al. |
| 2014/0110354 | A1 | 4/2014 | Haberkamp et al. |
| 2014/0123613 | A1 | 5/2014 | Le Port et al. |
| 2014/0275692 | A1 | 9/2014 | Patel et al. |
| 2014/0291222 | A1 | 10/2014 | Behrendt et al. |
| 2014/0360145 | A1 | 12/2014 | Hamada et al. |
| 2015/0157971 | A1 | 6/2015 | Tong et al. |
| 2015/0174509 | A1 | 6/2015 | Swaminathan |
| 2015/0298070 | A1 | 10/2015 | Koslov et al. |
| 2015/0354139 | A1 | 12/2015 | Geisen et al. |
| 2015/0360159 | A1 | 12/2015 | Lee et al. |
| 2016/0023146 | A1 | 1/2016 | Hampton et al. |
| 2016/0038864 | A1 | 2/2016 | Calcaterra et al. |
| 2016/0038865 | A1 | 2/2016 | Jones et al. |
| 2016/0051918 | A1 | 2/2016 | Walz et al. |
| 2016/0051919 | A1 | 2/2016 | Nagy et al. |
| 2016/0051920 | A1 | 2/2016 | Sato et al. |
| 2016/0067641 | A1* | 3/2016 | Rodriguez ........... B01D 39/163 210/505 |
| 2016/0074790 | A1 | 3/2016 | Kuroda et al. |
| 2016/0136553 | A1 | 5/2016 | Healey et al. |
| 2016/0136584 | A1 | 5/2016 | Hwang et al. |

(56) References Cited

U.S. PATENT DOCUMENTS

| | | | | |
|---|---|---|---|---|
| 2016/0166953 | A1 | 6/2016 | Swaminathan et al. | |
| 2016/0166961 | A1 | 6/2016 | Haberkamp et al. | |
| 2016/0175748 | A1 | 6/2016 | Park | |
| 2016/0243478 | A1 | 8/2016 | Park | |
| 2016/0256805 | A1 | 9/2016 | Grein et al. | |
| 2016/0279548 | A1 | 9/2016 | Chavan et al. | |
| 2016/0361674 | A1 | 12/2016 | Swaminathan et al. | |
| 2016/0367922 | A1 | 12/2016 | Kamiyama | |
| 2017/0028329 | A1 | 2/2017 | Motomura et al. | |
| 2017/0080368 | A1 | 3/2017 | Smith et al. | |
| 2017/0128892 | A1 | 5/2017 | Yu et al. | |
| 2017/0173509 | A1 | 6/2017 | Giglia et al. | |
| 2017/0232372 | A1 | 8/2017 | Zhang et al. | |
| 2017/0296953 | A1 | 10/2017 | Parker | |
| 2017/0304755 | A1 | 10/2017 | Bansal et al. | |
| 2017/0306148 | A1 | 10/2017 | Bansal et al. | |
| 2017/0319994 | A1 | 11/2017 | Parker | |
| 2017/0361254 | A1 | 12/2017 | Huang et al. | |
| 2018/0001247 | A1 | 1/2018 | Jinka et al. | |
| 2018/0085698 | A1 | 3/2018 | Motomura et al. | |
| 2018/0169551 | A1 | 6/2018 | Jaganathan et al. | |
| 2018/0178150 | A1 | 6/2018 | Neumann et al. | |
| 2018/0236385 | A1 | 8/2018 | Jinka et al. | |
| 2018/0272258 | A1 | 9/2018 | Healey et al. | |
| 2018/0280845 | A1 | 10/2018 | Barlow, Jr. et al. | |
| 2018/0280846 | A1 | 10/2018 | Barlow, Jr. et al. | |
| 2018/0280847 | A1 | 10/2018 | Barlow, Jr. et al. | |
| 2018/0361287 | A1 | 12/2018 | Zhang et al. | |
| 2019/0224598 | A1 | 7/2019 | Chavan et al. | |
| 2019/0255473 | A1 | 8/2019 | Gao et al. | |
| 2019/0314747 | A1* | 10/2019 | Nagy | B01D 39/18 |
| 2020/0038793 | A1 | 2/2020 | Jaganathan et al. | |
| 2020/0078742 | A1 | 3/2020 | Seo et al. | |
| 2020/0171418 | A1 | 6/2020 | Rezaei et al. | |
| 2020/0217275 | A1 | 7/2020 | Krauss et al. | |
| 2020/0391147 | A1 | 12/2020 | Schmalz | |
| 2021/0086116 | A1 | 3/2021 | Shim et al. | |
| 2021/0093989 | A1 | 4/2021 | Doucoure et al. | |
| 2021/0170317 | A1 | 6/2021 | Janikowski et al. | |
| 2021/0178300 | A1 | 6/2021 | Schwandt et al. | |
| 2021/0213378 | A1 | 7/2021 | Shim et al. | |
| 2021/0236971 | A1 | 8/2021 | Umebayashi | |
| 2021/0370208 | A1 | 12/2021 | Yegya-Raman et al. | |
| 2021/0370218 | A1 | 12/2021 | Daus et al. | |
| 2021/0387120 | A1 | 12/2021 | Petri et al. | |
| 2022/0047015 | A1 | 2/2022 | Duffy | |
| 2022/0047976 | A1 | 2/2022 | Rao et al. | |
| 2022/0162785 | A1 | 5/2022 | Adachi et al. | |
| 2022/0193587 | A1 | 6/2022 | Cheng et al. | |
| 2022/0347611 | A1 | 11/2022 | Babcock | |
| 2022/0379249 | A1 | 12/2022 | Jones et al. | |
| 2022/0387915 | A1 | 12/2022 | Ignacio-de Leon et al. | |
| 2023/0018302 | A1 | 1/2023 | Jones et al. | |
| 2023/0051258 | A1 | 2/2023 | Jaganathan et al. | |
| 2023/0149840 | A1 | 5/2023 | Rogers et al. | |

FOREIGN PATENT DOCUMENTS

| | | | |
|---|---|---|---|
| CN | 105392544 | A | 3/2016 |
| CN | 105451854 | A | 3/2016 |
| CN | 106573191 | A | 4/2017 |
| CN | 107051016 | A | 8/2017 |
| CN | 108330556 | A | 7/2018 |
| CN | 109310936 | A | 2/2019 |
| CN | 109562311 | A | 4/2019 |
| CN | 110124413 | A | 8/2019 |
| DE | 102013008391 | A1 | 10/2014 |
| DE | 112013005087 | T5 | 7/2015 |
| DE | 112014003579 | T5 | 4/2016 |
| DE | 102015002672 | A1 | 9/2016 |
| DE | 112015002324 | T5 | 3/2017 |
| EP | 1764144 | A1 | 3/2007 |
| EP | 1860236 | A2 | 11/2007 |
| EP | 1894609 | A1 | 3/2008 |
| EP | 1689510 | B1 | 7/2009 |
| EP | 2589422 | A2 | 5/2013 |
| EP | 2822670 | A2 | 1/2015 |
| EP | 2958652 | A1 | 12/2015 |
| EP | 2222385 | B1 | 6/2016 |
| EP | 3029190 | A1 | 6/2016 |
| EP | 3056597 | A1 | 8/2016 |
| EP | 3064262 | A1 | 9/2016 |
| EP | 3083003 | A1 | 10/2016 |
| EP | 3100779 | A1 | 12/2016 |
| EP | 3142774 | A1 | 3/2017 |
| EP | 3225294 | A1 | 10/2017 |
| EP | 2809433 | B1 | 11/2017 |
| EP | 2987544 | B1 | 12/2017 |
| EP | 3100779 | B1 | 3/2018 |
| EP | 2361144 | B1 | 5/2018 |
| EP | 2864019 | B1 | 9/2018 |
| EP | 3416735 | A1 | 12/2018 |
| EP | 3445470 | A1 | 2/2019 |
| EP | 3056598 | B1 | 4/2019 |
| EP | 3508265 | A1 | 7/2019 |
| EP | 3519076 | A1 | 8/2019 |
| EP | 3445899 | A4 | 11/2019 |
| EP | 3233240 | B1 | 2/2020 |
| EP | 3357564 | B1 | 3/2020 |
| EP | 3738659 | A1 | 11/2020 |
| EP | 3039177 | B1 | 10/2021 |
| EP | 3895779 | A1 | 10/2021 |
| EP | 3906991 | A1 | 11/2021 |
| EP | 3781286 | B1 | 6/2022 |
| ES | 2731684 | T3 | 11/2019 |
| IN | 325621 | B | 3/2014 |
| JP | H0312208 | A | 1/1991 |
| JP | H04313313 | A | 11/1992 |
| JP | H05295645 | A | 11/1993 |
| JP | 2007170224 | A | 7/2007 |
| JP | 2011512252 | A | 4/2011 |
| JP | 2011089226 | A | 5/2011 |
| JP | 2012516399 | A | 7/2012 |
| JP | 2016176173 | A | 10/2016 |
| JP | 6045687 | B2 | 12/2016 |
| JP | 2017020507 | A | 1/2017 |
| JP | 2018126721 | A | 8/2018 |
| JP | 2019077962 | A | 5/2019 |
| KR | 101416614 | B1 | 7/2014 |
| KR | 101479752 | B1 | 1/2015 |
| KR | 101479753 | B1 | 1/2015 |
| PL | 233499 | B1 | 10/2019 |
| WO | 2006049664 | A1 | 5/2006 |
| WO | 2006052732 | A2 | 5/2006 |
| WO | 2006089063 | A2 | 8/2006 |
| WO | 2007133403 | A2 | 11/2007 |
| WO | 2008142023 | A2 | 11/2008 |
| WO | 2009014539 | A1 | 1/2009 |
| WO | 2009067365 | A2 | 5/2009 |
| WO | 2010009043 | A2 | 1/2010 |
| WO | 2010124899 | A1 | 11/2010 |
| WO | 2013043987 | A1 | 3/2013 |
| WO | 2013170890 | A1 | 11/2013 |
| WO | 2014130933 | A1 | 8/2014 |
| WO | 2014164130 | A1 | 10/2014 |
| WO | 2015016449 | A1 | 2/2015 |
| WO | 2015017795 | A2 | 2/2015 |
| WO | 2015053442 | A1 | 4/2015 |
| WO | 2015053443 | A1 | 4/2015 |
| WO | 2015091181 | A2 | 6/2015 |
| WO | 2015157638 | A2 | 10/2015 |
| WO | 2016022758 | A1 | 2/2016 |
| WO | 2016100300 | A8 | 7/2016 |
| WO | 2016205621 | A1 | 12/2016 |
| WO | 2016210153 | A1 | 12/2016 |
| WO | 2017184982 | A1 | 10/2017 |
| WO | 2017196653 | A1 | 11/2017 |
| WO | 2017214419 | A1 | 12/2017 |
| WO | 2018011347 | A1 | 1/2018 |
| WO | 2018175556 | A1 | 9/2018 |
| WO | 2018193165 | A1 | 10/2018 |
| WO | 2018208819 | A1 | 11/2018 |
| WO | 2019202212 | A1 | 10/2019 |
| WO | 2019202213 | A1 | 10/2019 |

(56) References Cited

FOREIGN PATENT DOCUMENTS

| | | | |
|---|---|---|---|
| WO | 2020025956 | A1 | 2/2020 |
| WO | 2020052884 | A1 | 3/2020 |
| WO | 2020152551 | A1 | 7/2020 |
| WO | 2021072117 | A1 | 4/2021 |
| WO | 2021072122 | A1 | 4/2021 |
| WO | 2021203066 | A1 | 10/2021 |
| WO | 2021203067 | A1 | 10/2021 |
| WO | 2021203068 | A1 | 10/2021 |

OTHER PUBLICATIONS

Yoon et al., "High flux ultrafiltration membranes based on electrospun nanofibrous PAN scaffolds and chitosan coating," Polymer, 2006, vol. 47, pp. 2434-2441.
Wikipedia, "Powered air-purifying respirator," retrieved from the Internet on Mar. 20, 2023, <URL:https:en.wikipedia.org/wiki/Powered_air-purifying_respirator>, 5 pages.
Wertz et al., "Filtration media: Advantages of nanofibre coating technology," Filtration & Separation, Jul./Aug. 2009, vol. 46, No. 4, pp. 18-20.
Wang et al., "Computational characterization of nonwoven fibrous media: 1. Pore-network extractionand morphological analysis," Physical Review Materials, 2020, vol. 4, No. 083803, 11 pages.
Cerex Advanced Fabrics, Inc., "Benefits of Spunbond Substrate Uniformity in Advanced Filtration Media," date unavailable but believed to be available as early as 2018, retrieved from the Internet on Dec. 5, 2019, <URL:https://www.cerex.com/wp-content/uploads/2018/03/benefits-of-spunbond-substrate-uniformity-in-advanced-filtration-media.pdf>, 19 pages.
Chinga-Carrasco, "Cellulose fibres, nanofibrils and microfibrils: The morphological sequence of MFC components from a plant physiology and fibre technology point of view," Nanoscale Research Letters, 2011, vol. 6, No. 417, 7 pgs.
Fong et al., "Beaded nanofibers formed during electrospinning," Polymer, 1999, vol. 40, pp. 4585-4592.
Hollingsworth & Vose, "Technostat Electrostatic Filter Media," Mar. 8, 2011, 2 pages.
Hollingsworth & Vose, Technostat® Product Information, 2023, retrieved from the Internet on Mar. 20, 2023, <URL: https://www.hollingsworth-vose.com/brands/filtration/technostat/>, 5 pages.
Hutten, Handbook of Nonwoven Filter Media, Butterworth-Heinemann, an imprint of Elsevier: Oxford, UK; 2007, 13 pgs.
International Prelimary Report on Patentability in PCT/US2020/054844, mailed Apr. 12, 2022, 7 pages.
International Preliminary Report on Patentability in PCT/US2020/054837, mailed Apr. 12, 2022, 7 pages.
International Preliminary Report on Patentability in PCT/US2021/025673, mailed Sep. 29, 2022, 7 pages.
International Preliminary Report on Patentability in PCT/US2021/025674, mailed Sep. 29, 2022, 7 pages.
International Preliminary Report on Patentability in PCT/US2021/025676, mailed Sep. 29, 2022, 14 pages.
International Search Report and Written Opinion in PCT/US2020/054837, mailed Jan. 14, 2021, 10 pages.
International Search Report and Written Opinion in PCT/US2021/025674, mailed Jul. 19, 2021, 10 pages.
International Search Report and Written Opinion in PCT/US2021/025676, mailed Sep. 16, 2021, 19 pages.
International Search Report and Written Opinion in PDT/US2021/025673, mailed Jul. 19, 2021, 10 pages.
International Search Report and Written Opinion in PCT/US2020/054844, mailed Jan. 26, 2021, 9 pages.
Invitation to Pay Additional Fees in PCT/US2021/025676, mailed Jul. 26, 2021, 12 pages.
Teijin Aramind, "A truee all-around para-aramid performer," Twaron® Product Brochure, Nov. 6, 2018, 9 pages.
Superior Felt & Filtration, Sub-Micron Fibers—Technostat® Filter Media for Air & Liquid Applications, 2017, 8 pages.
Subbiah et al., "Electrospinning of Nanofibers," Journal of Applied Polymer Science, 2005, vol. 96, pp. 557-569.
Kirsch et al., "Studies on Fibrous Aerosol Filters—III Diffusional Deposition of Aerosol in Fibrous Filter," Ann. Occup. Hyg., 1968, vol. 11, pp. 299-304 (Abstract Only).
Ma et al., "Fabrication and characterisation of cellulose nanofiber based thin-film nanofibrous composite membranes," Journal of Membrane Science, 2014, vol. 454, pp. 272-282.
Purchas, Handbook of Filter Media, 1st Edition, Elsevier Advanced Technology: Oxford, UK; 1996, pp. 152 and 154.
Sheffield, "Changes in Filtration and Contamination," Schroeder Industries, retrieved from the Internet Oct. 7, 2019 <URL:https://www.machinerylubrication.com/Articles/Print/704>, 5 pages.
"The new Filter Media Synteq XP" Brochure, Donaldson Filtration Soltions, Apr. 2009, 4 pages.

* cited by examiner

FILTRATION COMPOSITES

CROSS REFERENCE TO RELATED APPLICATIONS

This application is the § 371 U.S. National Stage of International Application No. PCT/US2021/025674, filed 2 Apr. 2021, which claims the benefit of U.S. Provisional Application No. 63/004,926, filed 3 Apr. 2020, and of U.S. Provisional Application No. 63/081,159, filed 21 Sep. 2020, the disclosures of which are incorporated by reference herein in their entireties.

BACKGROUND

Filtration media, such as the filtration media used for fuel filtration, often include glass microfibers. During certain types of filtration, however, there is a concern that glass microfibers may be released from the filtration media resulting in environmental contamination or, in the case of filtered fuel, resulting in damage to the internal combustion engine.

SUMMARY OF THE INVENTION

This disclosure describes composites that includes multiple layers of filtration media, methods of making those composites, and methods of using those composites. The compositions are preferably substantially glass-free or glass-free and exhibit capacity and efficiency comparable to or better than similar glass-containing filtration media.

In one aspect, this disclosure describes a composite including a first nonwoven filtration medium; optionally, a second nonwoven filtration medium; and a third nonwoven filtration medium. The composite is substantially free of glass fiber. The first nonwoven filtration medium includes 40 wt-% to 90 wt-% of a first bicomponent fiber having a fiber diameter in a range of 5 microns to 50 microns and a fiber length of 0.1 cm to 15 cm; 0 wt-% to 25 wt % of a first large efficiency fiber having a fiber diameter in a range of 1 micron to 5 microns; and 10 wt-% to 60 wt % of a first microfibrillated fiber, wherein a majority of the microfibrillated fibers have a lateral dimension of up to 4 microns. The optional second nonwoven filtration medium includes 40 wt-% to 90 wt-% of a second bicomponent fiber having a fiber diameter in a range of 5 microns to 50 microns and a fiber length of 0.1 cm to 15 cm; 0 wt-% to 25 wt % of a second large efficiency fiber having a fiber diameter in a range of 1 micron to 5 microns; and 10 wt-% to 60 wt % of a second microfibrillated fiber, wherein a majority of the microfibrillated fibers have a lateral dimension of up to 4 microns. The third nonwoven filtration medium includes a small efficiency fiber having a fiber diameter of at least 0.1 micron and less than 1 micron.

In some embodiments, the structural polymer portion of the bicomponent fiber has a melting point of at least 240° C. and the binder polymer portion of the bicomponent fiber has a melting point in a range of 100° C. to 190° C.

In some embodiments, the first large efficiency fiber includes polyethylene terephthalate (PET), the second large efficiency fiber includes PET, or both the first large efficiency fiber and the second large efficiency fiber include PET.

In some embodiments, the small efficiency fiber has a fiber diameter in a range of 0.6 micron to 0.8 micron.

In some embodiments, the small efficiency fiber includes polyethylene terephthalate (PET).

In some embodiments, the composite is substantially free of resin.

In some embodiments, the composite is free of glass fiber.

In some embodiments, the first nonwoven filtration medium, the second nonwoven filtration medium, and the third nonwoven filtration medium are discrete layers.

In some embodiments, the nonwoven filtration medium is configured for a liquid to pass through the first nonwoven filtration medium, then the second nonwoven filtration medium, and then the third nonwoven filtration medium.

In some embodiments, the nonwoven filtration medium further includes a support layer. The third nonwoven filtration medium may be in contact with the support layer.

In some embodiments, the microfibrillated fibers comprise microfibrillated cellulose fibers.

In another aspect, this disclosure describes a method of filtering a liquid stream, the method including passing a liquid stream comprising a contaminant through a composite as described herein and removing the contaminant from the liquid stream. The liquid stream may include air.

In another aspect, this disclosure describes a method of making through a composite as described herein, the method including independently making the first nonwoven filtration medium, the second nonwoven filtration medium, and the third nonwoven filtration medium.

As used herein, micron is equivalent to micrometer (μm).

As used herein, "fibers" have an aspect ratio (i.e., length to lateral dimension) of greater than 3:1, and preferably greater than 5:1. For example, fiberglass typically has an aspect ratio of greater than 100:1. In this context, the "lateral dimension" is the width (in 2 dimensions) or diameter (in 3 dimensions) of a fiber. The term "diameter" refers either to the diameter of a circular cross-section of a fiber, or to a largest cross-sectional dimension of a non-circular cross-section of a fiber. Fiber lengths may be of finite lengths or infinite lengths, depending on the desired result.

As used herein, the "β ratio" or "β" is the ratio of upstream particles to downstream particles under steady flow conditions (ISO 16889:2008), as described in the Examples. The more efficient the filter, the higher the ratio. The ratio is defined as follows:

$$\beta_d = \frac{N_{d,U}}{N_{d,D}}$$

where $N_{d,U}$ is the upstream particle count per unit fluid volume for particles of diameter d or greater and $N_{d,D}$ is the downstream particle count per unit fluid volume for particles of diameter d or greater. If present, the subscript attached to β (for example, d) indicates the particle size for which the ratio is being reported.

The term "substantially free of" as used herein indicates that the filtration medium does not contain an amount of the listed component (for example, glass fiber or resin) that contributes to the activity or action of the filtration medium to any substantial extent. The term is intended to include the inclusion of insignificant amounts of the component that do not provide any substantial contribution to the filtration medium's filtration properties. For example, a filtration medium that is substantially free of glass may include less than 1 wt-% glass fiber. For example, a filtration medium that is substantially free of resin may include less than 5 wt-% resin.

The term "free of" as used herein indicates that the filtration medium does not contain an amount of the listed component (for example, glass fiber or resin). For example, a "glass-free" filtration medium does not include any glass and a "resin-free" media does not include any resin.

Any reference to standard methods (for example, ASTM, TAPPI, etc.) refer to the most recent available version of the method at the time of filing of this disclosure unless otherwise indicated.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

Unless otherwise specified, "a," "an," "the," and "at least one" are used interchangeably and mean one or more than one.

As used herein, the term "or" is generally employed in its usual sense including "and/or" unless the content clearly dictates otherwise.

The term "and/or" means one or all of the listed elements or a combination of any two or more of the listed elements. Also herein, the recitations of numerical ranges by endpoints include all numbers subsumed within that range (for example, 1 to 5 includes 1, 1.5, 2, 2.75, 3, 3.80, 4, 5, etc.).

Herein, "up to" a number (for example, up to 50) includes the number (for example, 50).

The term "in the range" or "within a range" (and similar statements) includes the endpoints of the stated range.

For any method disclosed herein that includes discrete steps, the steps may be conducted in any feasible order. And, as appropriate, any combination of two or more steps may be conducted simultaneously.

All headings are for the convenience of the reader and should not be used to limit the meaning of the text that follows the heading, unless so specified.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1A:
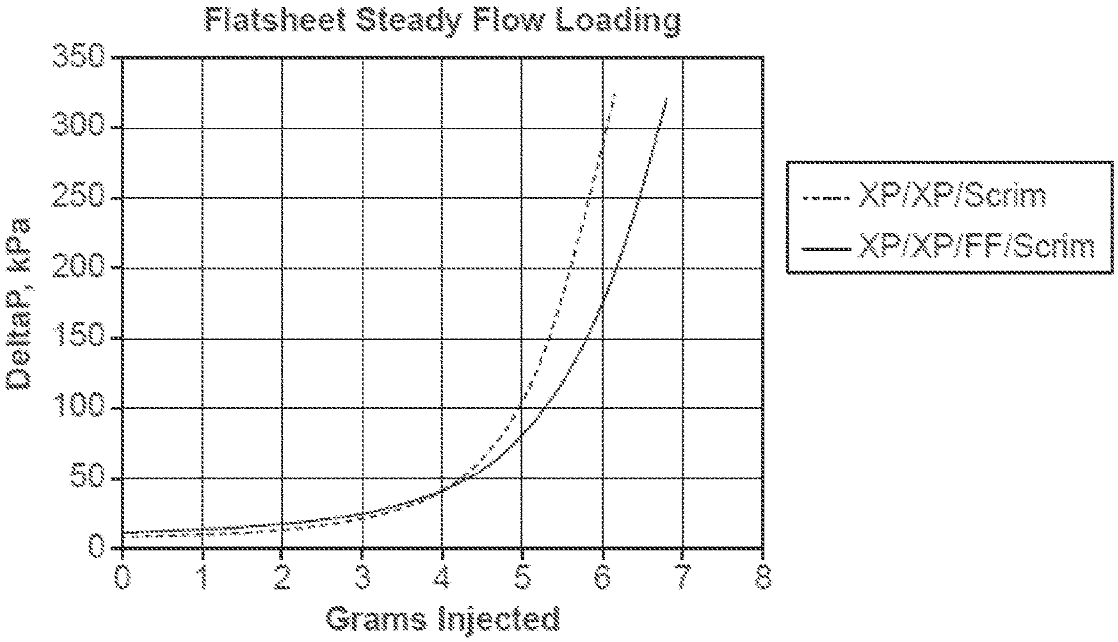
FIG. 1A shows the loading capacity of a composite prepared as described in Example 1.

This disclosure describes composites that includes multiple layers of filtration media, methods of making those composites, and methods of using those composites. The compositions are preferably substantially glass-free or glass-free and exhibit capacity and efficiency comparable to or better than similar glass-containing filtration media.

Composite

In one aspect, this disclosure describes a composite that includes multiple nonwoven filtration media. In some embodiments, each of the nonwoven filtration media are preferably substantially glass-free or glass-free.

The composite includes a first nonwoven filtration medium, an optional second nonwoven filtration medium, and a third nonwoven filtration medium. The first nonwoven filtration media includes a first bicomponent fiber; a first large efficiency fiber having a fiber diameter in a range of 1 micron to 5 microns; and a first microfibrillated fiber. The second nonwoven filtration media, if present, includes a second bicomponent fiber; a second large efficiency fiber having a fiber diameter in a range of 1 micron to 5 microns; and a second microfibrillated fiber. The third nonwoven filtration medium includes a small efficiency fiber having a fiber diameter of at least 0.1 micron and less than 1 micron. As used herein, a "large efficiency fiber" is a fiber having a fiber diameter in a range of 1 micron to 5 microns. As used herein, a "small efficiency fiber" is a fiber having a fiber diameter of at least 0.1 micron and less than 1 micron.

In some embodiments, the small efficiency fiber preferably includes polyethylene terephthalate (PET). In some embodiments the first large efficiency fiber preferably includes PET. In some embodiments the second large efficiency fiber preferably includes PET. In some embodiments, one or more of the fibers of the composite or a layer of the composite may be selected or treated to alter the electrostatic charge of the media. The charge typically includes layers of positive or negative charges trapped at or near the surface of the polymer, or charge clouds stored in the bulk of the polymer. The charge may also include polarization charges which are frozen in alignment of the dipoles of the molecules. Methods of subjecting a material to an electric charge are well known by those skilled in the art. These methods include, for example, thermal, liquid-contact, electron beam, plasma, and corona discharge methods.

In some embodiments, the composite further includes a support layer.

In some embodiments, the first nonwoven filtration medium, the optional second nonwoven filtration medium, if present, and the third nonwoven filtration medium are discrete layers. That is, a gradient does not exist between the first nonwoven filtration medium and the second nonwoven filtration medium or between the second nonwoven filtration medium and the third nonwoven filtration medium. If no second nonwoven filtration medium is present, a gradient does not exist between the first nonwoven filtration medium and the third nonwoven filtration medium.

In some embodiments, the first nonwoven filtration medium is in contact with the second nonwoven filtration medium, and the second nonwoven filtration medium is in contact with the third nonwoven filtration medium. When the composite further includes a support layer, the third nonwoven filtration medium may be in contact with the support layer.

In some embodiments, the composite is configured for a liquid to pass through the first nonwoven filtration medium, then the second nonwoven filtration medium, and then the third nonwoven filtration medium.

In some embodiments, when the composite includes a support layer, the composite is configured for a liquid to pass through the first nonwoven filtration medium, then the second nonwoven filtration medium, then the third nonwoven filtration medium, and then the support layer.

In some embodiments, the first nonwoven filtration medium is in contact with the third nonwoven filtration medium. When the composite further includes a support layer, the third nonwoven filtration medium may be in contact with the support layer.

In some embodiments, the composite is configured for a liquid to pass through the first nonwoven filtration medium, then the third nonwoven filtration medium. When the composite further includes a support layer, the composite is configured for a liquid to pass through the first nonwoven filtration medium, then the third nonwoven filtration medium, and then the support layer.

In some embodiments, the composite is substantially free of resin. In some embodiments, the composite does not include a resin.

The composite is substantially free of glass including, for example, a glass fiber. In some embodiments, the composite does not include glass.

In an exemplary embodiment, the composite includes a first nonwoven filtration medium, an optional second nonwoven filtration medium, and a third nonwoven filtration medium. The first nonwoven filtration medium includes: 40 wt-% to 90 wt-% of a first bicomponent fiber having a fiber diameter in a range of 5 microns to 50 microns and a fiber length of 0.1 cm to 15 cm; 0 wt-% to 25 wt % of a first large efficiency fiber; and 10 wt-% to 60 wt % of a first microfibrillated fiber, wherein a majority of the microfibrillated fibers have a lateral dimension of up to 4 microns. The optional second nonwoven filtration medium includes: 40 wt-% to 90 wt-% of a second bicomponent fiber having a fiber diameter in a range of 5 microns to 50 microns and a fiber length of 0.1 cm to 15 cm; 0 wt-% to 25 wt % of a second large efficiency fiber; and 10 wt-% to 60 wt % of a second microfibrillated fiber, wherein a majority of the microfibrillated fibers have a lateral dimension of up to 4 microns. The third nonwoven filtration medium includes a small efficiency fiber.

Figure 2A:
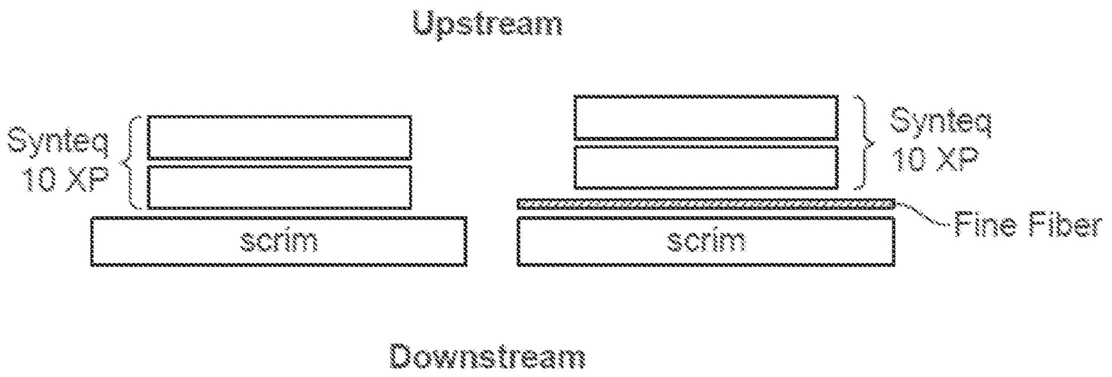
FIG. 2A shows a schematic of an exemplary composite, which, in some embodiments, may be prepared as described in Example 1.
Figure 2B:
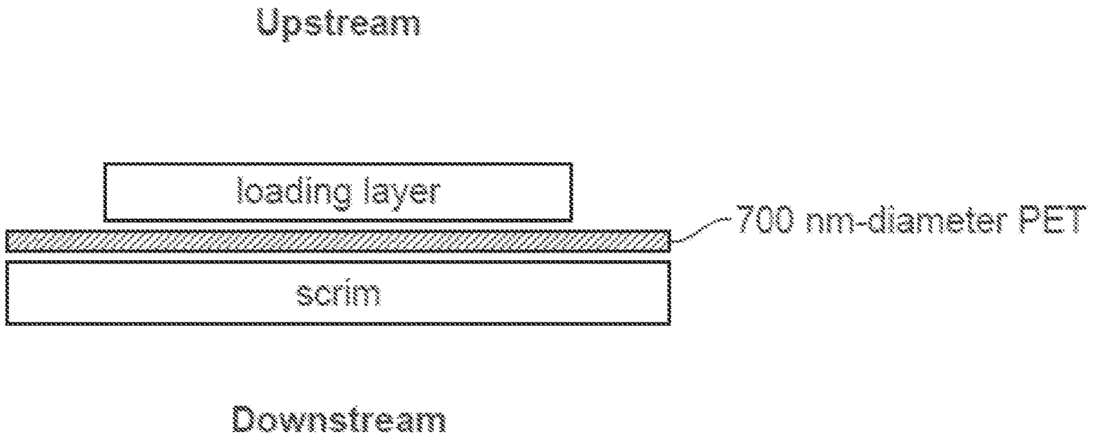
FIG. 2B shows a schematic of an exemplary composite.
Figure 2C:
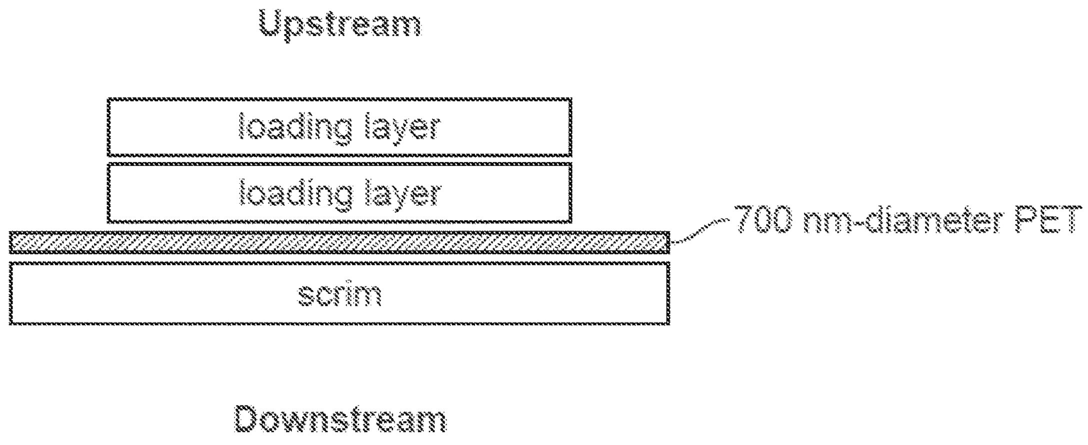
FIG. 2C shows a schematic of an exemplary composite, which, in some embodiments, may be prepared as described in Example 2.

One exemplary embodiment is shown in FIG. 2C.

As described in Example 1, the addition of a 1 μm-diameter electrospun fine fiber layer to a filter media composite increased the efficiency of the composite compared to the composite without the fine fiber layer. As further described in Example 2 and as shown in FIG. 2C, the fine fiber layer may be replaced by a layer including a small efficiency fine fiber—and the resulting composite is expected to have similar efficiency as the composite including the fine fiber layer.

The results of Example 1 were unexpected because it has been previously reported that creating an interface between media layers is undesirable and a gradient structure should be pursued instead. (See, for example, US Publication No. 2014/0360145.) Without wishing to be bound by theory, it is believed that the creation of an interface between media layers (including, for example a layer of non-woven filtration media including a layer including a small efficiency fine fiber and a layer of filtration media acting as a loading layer) may allow for higher efficiency than the use of gradient structure because the non-uniformities of each layer do not align throughout the depth of the media.

First and Second Nonwoven Filtration Media

The first nonwoven filtration medium and optional second nonwoven filtration medium, if present, each include a bicomponent fiber, a large efficiency fiber having a fiber diameter in a range of 1 micron to 5 microns, and a microfibrillated fiber.

In some embodiments, either or both of the first and second nonwoven filtration media act as loading layers, that is a filter medium that distributes the locations where contaminants are collected across the depth of the media. An exemplary embodiment in which both of the first and second nonwoven filtration media act as loading layers is described in FIG. 2C. An exemplary embodiment wherein the second nonwoven filtration is not included is shown in FIG. 2B.

In some embodiments, either or both of the first and second nonwoven filtration media has a solidity of at least 2%, at least 3%, at least 4%, at least 5%, at least 6%, at least 7%, at least 8%, at least 9%, or at least 10%. In some embodiments, the nonwoven filtration medium has a solidity of up to 5%, up to 6%, up to 7%, up to 8%, up to 9%, up to 10%, up to 11%, up to 12%, up to 13%, up to 14%, up to 15%, up to 16%, up to 17%, up to 18%, up to 19%, or up to 20%. In an exemplary embodiment, the first nonwoven filtration medium has a solidity in a range of 5% to 15%. In an exemplary embodiment, the second nonwoven filtration medium has a solidity in a range of 5% to 15%. In some embodiments, solidity is preferably measured as described in the Examples.

In some embodiments, either or both of the first and second nonwoven filtration media has a basis weight of at least 20 g/m$^2$, at least 24 g/m$^2$, at least 25 g/m$^2$, at least 30 g/m$^2$, at least 35 g/m$^2$, at least 40 g/m$^2$, at least 50 g/m$^2$, at least 60 g/m$^2$, or at least 70 g/m$^2$. In some embodiments, the nonwoven filtration medium has a basis weight of up to 25 g/m$^2$, up to 30 g/m$^2$, up to 35 g/m$^2$, up to 40 g/m$^2$, up to 50 g/m$^2$, up to 60 g/m$^2$, up to 70 g/m$^2$, up to 75 g/m$^2$, up to 80 g/m$^2$, up to 85 g/m$^2$, up to 90 g/m$^2$, up to 95 g/m$^2$, up to 100 g/m$^2$, or up to 105 g/m$^2$. In an exemplary embodiment, the first nonwoven filtration medium has a basis weight in a range of 24 g/m$^2$ to 100 g/m$^2$. In an exemplary embodiment, the second nonwoven filtration medium has a basis weight in a range of 24 g/m$^2$ to 100 g/m$^2$. In some embodiments, basis weight is preferably measured using ASTM D646-13.

In some embodiments, either or both of the first and second nonwoven filtration media has a pore size of at least 0.5 micron, at least 1 micron, at least 1.5 microns, at least 2 microns, at least 3 microns, at least 5 microns, or at least 10 microns. In some embodiments, the nonwoven filtration medium has a pore size of up to 5 microns, up to 10 microns, up to 15 microns or up to 20 microns. In an exemplary embodiment, the first nonwoven filtration medium has a pore size in a range of 0.5 micron to 20 microns. In an exemplary embodiment, the second nonwoven filtration medium has a pore size in a range of 0.5 micron to 20 microns. In another exemplary embodiment, the first non-woven filtration medium has a pore size in a range of 2 microns to 15 microns. In another exemplary embodiment, the second nonwoven filtration medium has a pore size in a range of 2 microns to 15 microns. Pore size, as used herein, refers to mean flow pore size, calculated as described in ASTM F316-03.

In some embodiments, either or both of the first and second nonwoven filtration media has a thickness of at least 0.1 mm, at least 0.12 mm, at least 0.15 mm, or at least 0.2 mm. In some embodiments, the nonwoven filtration medium has a thickness of up to 0.2 mm, up to 0.4 mm, up to 0.5 mm, up to 0.7 mm, or up to 1 mm. In an exemplary embodiment, the first nonwoven filtration medium has a thickness in a range of 0.12 mm to 1 mm. In an exemplary embodiment, the second nonwoven filtration medium has a thickness in a range of 0.12 mm to 1 mm. In some embodiments, thickness of the filtration medium has is preferably measured according to the TAPPI T411 om-15 test method using a foot pressure of 1.5 psi.

In some embodiments, either or both of the first and second nonwoven filtration media has a permeability of at least 1 ft$^3$/ft$^2$/min at 0.5 inches of water, at least 5 ft$^3$/ft$^2$/min at 0.5 μm inches of water, or at least 10 ft$^3$/ft$^2$/min at 0.5 inches of water. In some embodiments, the nonwoven filtration medium has a permeability of up to 10 ft$^3$/ft$^2$/min at 0.5 inches of water, up to 20 ft$^3$/ft$^2$/min at 0.5 inches of water, up to 50 ft$^3$/ft$^2$/min at 0.5 inches of water, up to 75 ft$^3$/ft$^2$/min at 0.5 inches of water, or up to 100 ft$^3$/ft$^2$/min at 0.5 inches of water. In an exemplary embodiment, the first nonwoven filtration medium has a permeability in a range of 1 ft$^3$/ft$^2$/min at 0.5 inches of water to 100 ft$^3$/ft$^2$/min at 0.5 inches of water. In an exemplary embodiment, the second nonwoven filtration medium has a permeability in a range of 1 ft$^3$/ft$^2$/min at 0.5 inches of water to 100 ft$^3$/ft$^2$/min at 0.5 inches of water. In another exemplary embodiment, the first nonwoven filtration medium has a permeability in a range of 10 ft$^3$/ft$^2$/min at 0.5 inches of water to 75 ft$^3$/ft$^2$/min at 0.5 inches of water. In another exemplary embodiment, the second nonwoven filtration medium has a permeability in a range of 10 ft$^3$/ft$^2$/min at 0.5 inches of water to 75 ft$^3$/ft$^2$/min at 0.5 inches of water. In some embodiments, air permeability is preferably measured according to ASTM D737-18.

In some embodiments, either or both of the first and second nonwoven filtration media is substantially free of resin. In some embodiments, either or both of the first and second nonwoven filtration media does not include a resin.

In some embodiments, either or both of the first and second nonwoven filtration media is substantially free of a glass fiber. In some embodiments, either or both of the first and second nonwoven filtration media does not include a glass fiber.

Bicomponent Fiber

The first and second filtration media each include a bicomponent fiber. Any suitable bicomponent fiber may be used for each medium, and the bicomponent fiber may be selected depending on the intended use for the media.

In some embodiments, each of the first and second filtration media includes at least 25 wt-%, at least 30 wt-%, at least 35 wt-%, at least 40 wt-%, at least 45 wt-%, at least 50 wt-%, at least 55 wt-%, at least 60 wt-%, at least 65 wt-%, or at least 70 wt-% of a bicomponent fiber. In some embodiments, each of the first and second filtration media includes up to 30 wt-%, up to 35 wt-%, up to 40 wt-%, up to 45 wt-%, up to 50 wt-%, up to 55 wt-%, up to 60 wt-%, up to 65 wt-%, up to 70 wt-%, up to 75 wt-%, up to 80 wt-%, up to 85 wt-%, up to 90 wt-% of the bicomponent fiber. In an exemplary embodiment, the first filtration medium includes 40 wt-% to 90 wt-% of the bicomponent fiber. In an exemplary embodiment, the second filtration medium includes 40 wt-% to 90 wt-% of the bicomponent fiber. In another exemplary embodiment, the first filtration medium includes 40 wt-% to 75 wt-% of the bicomponent fiber. In an exemplary embodiment, the second filtration medium includes 40 wt-% to 75 wt-% of the bicomponent fiber.

In some embodiments, the bicomponent fiber has a fiber diameter of at least 1 micron, at least 5 microns, at least 10 microns, at least 15 microns, or at least 20 microns. In some embodiments, the bicomponent fiber has a fiber diameter of up to 5 microns, up to 10 microns, up to 15 microns, up to 20 microns, up to 25 microns, up to 30 microns, up to 35 microns, up to 40 microns, up to 45 microns, or up to 50 microns. In an exemplary embodiment, the bicomponent fiber has a fiber diameter in a range of 5 microns to 50 microns. In another exemplary embodiment, the bicomponent fiber has a fiber diameter in a range of 5 microns to 25 microns. In another exemplary embodiment, the bicomponent fiber has a fiber diameter of 14 microns.

In some embodiments, the bicomponent fiber has a fiber length of at least 0.1 cm, at least 0.5 cm, or at least 1 cm. In some embodiment, the bicomponent fiber has a fiber length of up to 0.5 cm, up to 1 cm, up to 5 cm, up to 10 cm, or up to 15 cm. In an exemplary embodiment, the bicomponent fiber has a fiber length in a range of 0.1 cm to 15 cm. In another exemplary embodiment, the bicomponent fiber has a fiber length of 6 mm.

In some embodiments, the bicomponent fiber includes a structural polymer portion and a thermoplastic binder polymer portion, the structural polymer portion having a melting point of higher than that of the binder polymer portion.

The structural polymer portion and the binder polymer portion may be made out of any suitable materials. For example, the structural polymer portion may include PET and the binder polymer portion may include copolymer PET (coPET). In additional examples, the structural polymer portion may include PET and the binder polymer portion may include Polyethylene (PE), PET, nylon, polypropylene (PP), polytetrafluoroethylene (PTFE), polyethersulfone (PES), polyphenylene sulfide (PPS), meta-aramids, or para-aramids. In further examples, the binder polymer portion may include polyethylene (PE), polylactic acid (PLA), nylon, ethylene vinyl alcohol (EVOH), polyvinyl chloride (PVC), polyvinylidene fluoride (PVDF) (for example, KYNAR), or any other polymer or modified polymer that is designed with a lower melting temperature than the core structure polymer.

In some embodiments, the structural polymer portion is the core and the thermoplastic binder polymer portion is the sheath of the bicomponent fiber.

In some embodiments, the structural polymer portion of the bicomponent fiber has a melting point of at least 240° C. and the binder polymer portion of the bicomponent fiber has a melting point of up to 115° C. An exemplary bicomponent fiber wherein the structural polymer portion has a melting point of at least 240° C. and the binder polymer portion has a melting point of up to 115° C. is 271P, a 14 μm-diameter fiber available from Advansa (Hamm, Germany).

In some embodiments, the structural polymer portion of the bicomponent fiber has a melting point of at least 240° C. and the binder polymer portion of the bicomponent fiber has a melting point in a range of 100° C. to 190° C. In one exemplary embodiment, the structural polymer portion of the bicomponent fiber has a melting point of at least 240° C. and the binder polymer portion of the bicomponent fiber has a melting point in a range of 120° C. to 170° C. In another exemplary embodiment the structural polymer portion of the bicomponent fiber has a melting point of at least 240° C. and the binder polymer portion of the bicomponent fiber has a melting point in a range of 140° C. to 160° C.

Exemplary bicomponent fibers wherein the structural polymer portion has a melting point of at least 240° C. and the binder polymer portion has a melting point of in a range of 100° C. to 190° C. are TJ04CN (having a binder polymer portion melting point of 110° C.), TJ04BN (having a binder polymer portion melting point of 150° C.), both available from Teijin Fibers Limited of Osaka, Japan; 271P (having a binder polymer portion melting point of 110° C.), available from Advansa of Hamm, Germany; and T-202 or T-217 (each having a binder polymer portion melting point of 180° C.), both available from Fiber Innovation Technology, Inc. of Johnson City, TN.

In some embodiments, the first bicomponent fiber and the second bicomponent fiber may include two different bicomponent fibers or two different combinations of bicomponent fibers. In an exemplary embodiment, the bicomponent fiber may include a first bicomponent fiber wherein the structural portion has a melting point of at least 240° C. and the binder polymer portion has a melting point of up to 115° C. and a second bicomponent fiber wherein the structural polymer portion has a melting point of at least 240° C. and the binder polymer portion has a melting point in a range of 100° C. to 190° C. For example, the bicomponent fiber may include both Advansa 271P and TJ04BN.

Large Efficiency Fiber

The first and second filtration media may each include a "large efficiency fiber" wherein a "large efficiency fiber" as used herein is a fiber having a fiber diameter in a range of 1 micron to 5 microns. In some embodiments, one or both of the first and second filtration media does not include large efficiency fiber.

In some embodiments, the large efficiency fiber is preferably a PET fiber. In some embodiments, the large efficiency fiber may consist essentially of PET. In some embodiments, the large efficiency fiber may consist of PET.

Additionally or alternatively, the small efficiency fiber may include nylon, an acrylic, rayon, polypropylene, polyethylene, ethylene vinyl alcohol (EVOH), poly lactic acid (PLA), polyvinyl alcohol (PVA), polyvinyl chloride (PVC), polytetrafluoroethylene (PTFE), or other suitable meltable polymers.

In some embodiments, each of the first and second filtration media includes at least 0 wt-%, at least 0.1 wt-%, at least 1 wt-%, at least 5 wt-%, at least 10 wt-%, at least 15 wt-%, at least 20 wt-%, or at least 25 wt-% of the large efficiency fiber. In some embodiments, each of the first and second filtration media include up to 15 wt-%, up to 20 wt-%, or up to 25 wt-% of the large efficiency fiber. In an exemplary embodiment, the first filtration medium includes 0 wt-% to 25 wt-% of the large efficiency fiber. In an exemplary embodiment, the second filtration medium includes 0 wt-% to 25 wt-% of the large efficiency fiber. In another exemplary embodiment, the first filtration medium includes 10 wt-% to 25 wt-% of the large efficiency fiber. In another exemplary embodiment, the second filtration medium includes 10 wt-% to 25 wt-% of the large efficiency fiber.

In some embodiments, the large efficiency fiber has a fiber diameter of at least 1 micron, at least 1.5 microns, at least 2 microns, at least 3 microns, or at least 4 microns. In some embodiments, the large efficiency fiber has a fiber diameter of up to 1.5 microns, up to 2 microns, up to 3 microns, up to 4 microns, or up to 5 microns. For example, in an exemplary embodiment, the large efficiency fiber has a fiber diameter in a range of 2 microns to 4 microns. In another exemplary embodiment, the large efficiency fiber has a fiber diameter of 2.7 microns. In a further exemplary embodiment, the large efficiency fiber has a fiber diameter of 2.5 microns.

In the Examples, the large efficiency fiber includes PET and has a fiber diameter of 2.7 microns.

In some embodiments, the large efficiency fiber has a length of at least 0.5 mm, at least 1 mm, or at least 1.5 mm. In some embodiments, the large efficiency fiber has a length of up to 10 mm, up to 11 mm, up to 12 mm, or up to 15 mm. In an exemplary embodiment, the large efficiency fiber has a length in a range of 1 mm to 15 mm. In a further exemplary embodiment, the large efficiency fiber has a length in a range of 1 mm to 12 mm.

In some embodiments, when the large efficiency fiber includes PET, the PET has a melting point of at least 250° C., more preferably at least 275° C., even more preferably at least 290° C.

Microfibrillated Fiber

The first and optional second filtration media each include a microfibrillated fiber. As used herein, a microfibrillated fiber is a fiber that has been processed to develop fibers with a higher surface area, branched structure than unprocessed fibers.

In some embodiments, the microfibrillated fiber may be a microfibrillated acrylic fiber, including, for example, fibrillated CFF fibers (available from Engineered Fiber Technology, Shelton, CT). In some embodiments, the microfibrillated fiber may be a microfibrillated cellulose fiber including, for example, rayon such as Lyocell or TENCEL. In some embodiments, the microfibrillated fiber may be a microfibrillated para-aramid fiber including, for example, Twaron Pulp (Teijin Aramid, B.V., The Netherlands). In some embodiments, the microfibrillated fiber may be a microfibrillated liquid crystal polymer (LCP) fiber, including, for example, microfibrillated Vectran fibers (available from Engineered Fiber Technology, Shelton, CT). In some embodiments, the microfibrillated fiber may be a microfibrillated poly-p-phenylene benzobisoxazole (PBO) fiber including, for example, fibrillated Zylon fibers (available from Engineered Fiber Technology, Shelton, CT).

In some embodiments, each of the first and second filtration media includes at least 10 wt-%, at least 15 wt-%, at least 20 wt-%, at least 25 wt-%, at least 30 wt-%, at least 35 wt-%, at least 40 wt-%, at least 50 wt-%, or at least 55 wt-%, of the microfibrillated fiber. In some embodiments, the filtration medium includes up to 15 wt-%, up to 20 wt-%, up to 25 wt-%, up to 30 wt-%, up to 35 wt-%, up to 40 wt-%, up to 45 wt-%, up to 50 wt-%, up to 55 wt-%, or up to 60 wt of the microfibrillated fiber. In an exemplary embodiment, the filtration medium includes 10 wt-% to 60 wt-% of the microfibrillated fiber. In another exemplary embodiment, the filtration medium includes 10 wt-% to 40 wt-% of the microfibrillated fiber.

In some embodiments, the microfibrillated fiber may include a microfibrillated cellulose. As used herein, microfibrillated cellulose (MFC) herein refers to that material as defined by G. Chinga-Carrasco in *Nanoscale Research Letters,* 2011; 6:417: "MFC materials may be composed of (1) nanofibrils, (2) fibrillar fines, (3) fibre fragments and (4) fibres. This implies that MFC is not necessarily synonymous with microfibrils, nanofibrils or any other cellulose nanostructure. However, properly produced MFC materials contain nano-structures as a main component, i.e. nanofibrils." The diameters (or, for the microfibrillated cellulose fibers, the "lateral dimensions") of these components are reproduced in Table 1 of that same document and are as follows: (1) nanofibrils (<0.1 μm); (2) fibrillar fines (<1 μm); (3) fibres or fibre fragments (10 to 50 μm).

Furthermore, the term "microfibrillated cellulose," as used herein, does not include dry ground cellulose (also referred to as micronized cellulose or microfine cellulose) and does not include microcrystalline cellulose obtained by removing amorphous portions by acid hydrolysis, as described in U.S. Pat. No. 5,554,287.

In some embodiments, a majority (that is, greater than half) of the microfibrillated fibers have a lateral dimension (for example, width in 2 dimensions) of up to 1 micron, up to 1.5 microns, up to 2 microns, up to 3 microns, or up to 4 microns. In some embodiments, a majority of the microfibrillated fibers have a lateral dimension of at least 0.5 micron, or at least 0.7 micron. In an exemplary embodiment, a majority of the microfibrillated fibers have a lateral dimension in a range of 0.5 micron to 4 microns. In another exemplary embodiment, a majority of the microfibrillated fibers have a lateral dimension in a range of 0.5 micron to 1.5 microns. In a further exemplary embodiment, a majority of the microfibrillated fibers have a lateral dimension of up to 2 microns.

In some embodiments, the microfibrillated fibers are incorporated within (that is, distributed throughout) the fibrous media, thereby forming a filter media (also referred to herein as a "filtration medium" or "filter medium").

Third Nonwoven Filtration Medium

The third nonwoven filtration medium includes a "small efficiency fiber" wherein the "small efficiency fiber" as used herein is a fiber having a fiber diameter of at least 0.1 micron and less than 1 micron.

In some embodiments, the small efficiency fiber preferably includes PET. In some embodiments, the small efficiency fiber may consist essentially of PET. In some embodiments, the small efficiency fiber may consist of PET.

Additionally or alternatively, the small efficiency fiber may include nylon, an acrylic, rayon, polypropylene, polyethylene, ethylene vinyl alcohol (EVOH), poly lactic acid (PLA), polyvinyl alcohol (PVA), polyvinyl chloride (PVC), polytetrafluoroethylene (PTFE), or other suitable meltable polymers.

In some embodiments, the third nonwoven filtration medium may include fibers and components in addition to the small efficiency fiber. These additional fibers and components may include bicomponent fibers, a monocomponent thermally meltable fiber, resin, etc.

When the third nonwoven filtration medium may include fibers and components in addition to the small efficiency fiber, the third nonwoven filtration medium preferably includes at least 10 wt-%, at least 15 wt-%, at least 20 wt-%, at least 25 wt-%, at least 30 wt-%, at least 35 wt-%, at least 40 wt-%, or at least 45 wt-% of the small efficiency fiber. In some embodiments, the third nonwoven filtration medium includes up to 15 wt-%, up to 20 wt-%, up to 25 wt-%, up to 30 wt-%, up to 35 wt-%, up to 40 wt-%, up to 45 wt-%, or up to 50 wt-% of the small efficiency fiber.

In some embodiments, the small efficiency fiber has a fiber diameter of at least 0.1 micron, at least 0.2 micron, at least 0.3 micron, at least 0.4 micron, at least 0.5 micron, at least 0.6 micron, or at least 0.7 micron. In some embodiments, the small efficiency fiber has a fiber diameter of up to 0.7 micron, up to 0.8 micron, up to 0.9 micron, or less than 1 micron. For example, in an exemplary embodiment, the small efficiency fiber has a fiber diameter of at least 0.4 micron and less than 1 micron. In another exemplary embodiment, the small efficiency fiber has a fiber diameter in a range of 0.6 micron to 0.8 micron. In a further exemplary embodiment, the small efficiency fiber has a fiber diameter of 0.7 micron (700 nm).

In some embodiments, the small efficiency fiber has a length of at least 0.5 mm, at least 1 mm, or at least 1.5 mm. In some embodiments, the small efficiency fiber has a length of up to 10 mm, up to 11 mm, up to 12 mm, or up to 15 mm. In an exemplary embodiment, the small efficiency fiber has a length in a range of 1 mm to 15 mm. In a further exemplary embodiment, the small efficiency fiber has a length in a range of 1 mm to 12 mm.

In one exemplary embodiment, the small efficiency fiber is a PET fiber having a fiber diameter of 0.7 micron.

In some embodiments, when the small efficiency fiber includes PET, the PET of the small efficiency fiber has a melting point of at least 250° C., more preferably at least 275° C., even more preferably at least 290° C.

Support Layer

In some embodiments, the composite includes a support layer (also referred to as a scrim). Any suitable support layer may be used.

The support layer may include or be made of any suitable porous material. The support layer may, in some embodiments, preferably be polymeric.

Examples of suitable material for the support layer include spunbond, wetlaid, carded, or melt-blown nonwoven materials, or combinations thereof including, for example, a spunbond-meltblown-spunbond. Fibers may be in the form of wovens or nonwovens. Examples of synthetic nonwovens include polyester nonwovens, nylon nonwovens, polyolefin (for example, polypropylene) nonwovens, polycarbonate nonwovens, or blended or multicomponent nonwovens thereof. Sheet-like support layers (for example, cellulosic, synthetic, and/or glass or combination webs) are typical examples of filter support layers. Other examples of suitable support layers include polyester or bicomponent polyester fibers or polypropylene/polyethylene terephthalate, or polyethylene/polyethylene terephthalate bicomponent fibers in a spunbond.

In some embodiments, the support layer comprises a plurality of fibers or strands. The fibers or strands of the support layer be continuous or non-continuous. Continuous fibers (for example, strands) and are made by a "continuous" fiber-forming process, such as a meltblown process, a meltspun, an extrusion process, woven yarns, laid scrims, and/or a spunbond process, and typically have longer lengths than non-continuous fibers as described in more detail below. Non-continuous fibers are, for example, staple fibers that are generally cut (for example, from a filament) or formed as non-continuous discrete fibers to have a particular length or a range of lengths.

In certain embodiments, the plurality of fibers or strands of the support layer include synthetic fibers or strands (for example, synthetic polymer fibers or strands). The synthetic fibers or strands of the support layer may be continuous fibers. Non-limiting examples of suitable synthetic fibers/strands include polyester, polyaramid, polyimide, polyolefin (for example, polyethylene such as high density polyethylene, low density polyethylene, and/or linear low density polyethylene), ethylene-vinyl acetate, polyacrylamide, polylactic acid, polypropylene, Kevlar, Nomex, halogenated polymers (for example, polyethylene terephthalate), acrylics, polyphenylene oxide, polyphenylene sulfide, thermoplastic elastomers (for example, thermoplastic polyurethane), polymethyl pentene, and combinations thereof.

In some embodiments, the average pore size of the support layer is 100 microns or less and often at least 0.5 micron.

In some embodiments, the porosity of the support scrim is 20% or greater and typically no more than 90%.

Exemplary support layers include those available under the tradenames FINON C303NW and FINON C3019 NW from Midwest Filtration in Cincinnati, Ohio or those available under the tradename CEREX 23200 (Cerex Advanced Fabrics, Inc., Cantoment, FL). CEREX 23200 includes nylon 6,6, has a thickness of 8.4 mils (0.21 mm), a basis weight of 67.8 g/m$^2$, a solidity of 28%, and a permeability per solidity of 615.1. Other exemplary scrim materials are described, for example, in U.S. Pat. Pub. 2009/0120868.

Methods of Using the Composites

In another aspect, this disclosure describes methods of using the composites described herein.

In some embodiments, a method of using the composite includes filtering a liquid stream. For example, such a method may include passing a liquid stream comprising a contaminant through the composite, and removing the contaminant from the liquid stream.

The liquid stream may include, for example, fuel, hydraulic oil, process water, air, diesel engine fluid (DEF), diesel engine lube oil, blow-by gas, etc., and combinations thereof.

In some embodiments, a method of using the composite includes passing the liquid stream through the first nonwoven filtration medium, then the second nonwoven filtration medium, then the third nonwoven filtration medium.

Methods of Making the Composite

In a further aspect, this disclosure describes methods of making the composite.

In some embodiments, the first nonwoven filtration medium and the second nonwoven filtration medium may be made independently. In some embodiments, the first nonwoven filtration medium and the third nonwoven filtration medium may be made independently. In some embodiments, the second nonwoven filtration medium and the third nonwoven filtration medium may be made independently. In some embodiments, the first nonwoven filtration medium, the second nonwoven filtration medium, and the third nonwoven filtration medium may be made independently. When the nonwoven filtration media are made independently, they are not made in the same process even if they are formed by the same method. For example, even if each of the three filtration media are made using a wetlaid process, if they are made independently, they are formed in three separate wetlaid processes and then placed into contact with one another, not formed in a single wetlaid process.

In some embodiments, at least one of the first nonwoven filtration medium, the second nonwoven filtration medium, and the third nonwoven filtration medium are formed using a wetlaid process. In some embodiments, the first nonwoven filtration medium, the second nonwoven filtration medium, and the third nonwoven filtration medium are formed using a wetlaid process.

In some embodiments, the method of making the composite includes placing the first nonwoven filtration medium in contact with the second nonwoven filtration medium, or placing the second nonwoven filtration medium in contact with the third nonwoven filtration medium, or both.

When the composite includes a support layer, the method may further include placing the third nonwoven filtration medium in contact with the support layer. In some embodiments, the method may include forming the third nonwoven filtration medium on the support layer.

In some embodiments, the method of making the composite includes bonding the first nonwoven filtration medium to the second nonwoven filtration medium, or bonding the second nonwoven filtration medium to the third nonwoven filtration medium, or both. Any suitable means of bonding many be used including, for example, lamination.

Exemplary Composite Aspects

Aspect A1 is a composite comprising a first nonwoven filtration medium comprising: 40 wt-% to 90 wt-% of a first bicomponent fiber having a fiber diameter in a range of 5 microns to 50 microns and a fiber length of 0.1 cm to 15 cm; 0 wt-% to 25 wt % of a first large efficiency fiber having a fiber diameter in a range of 1 micron to 5 microns; and 10 wt-% to 60 wt % of a first microfibrillated fiber, wherein a majority of the microfibrillated fibers have a lateral dimension of up to 4 microns; optionally, a second nonwoven filtration medium comprising: 40 wt-% to 90 wt-% of a second bicomponent fiber having a fiber diameter in a range of 5 to 50 microns and a fiber length of 0.1 cm to 15 cm; 0 wt-% to 25 wt % of a second large efficiency fiber; and 10 wt-% to 60 wt % of a second microfibrillated fiber, wherein a majority of the microfibrillated fibers have a lateral dimension of up to 4 microns; and a third nonwoven filtration medium comprising a small efficiency fiber having a fiber diameter of at least 0.1 micron and less than 1 micron; wherein the composite is substantially free of glass fiber.

Aspect A2 is the composite of Aspect A1, wherein the first bicomponent fiber comprises a structural polymer portion and a thermoplastic binder polymer portion, wherein the structural polymer portion has a melting point higher than the melting point of the binder polymer portion. Aspect A3 is the composite of Aspect A1 or A2, wherein the second bicomponent fiber comprises a structural polymer portion and a thermoplastic binder polymer portion, wherein the structural polymer portion has a melting point higher than the melting point of the binder polymer portion.

Aspect A4 is the composite of Aspect A2 or A3, wherein the structural polymer portion of the bicomponent fiber has a melting point of at least 240° C. and the binder polymer portion of the bicomponent fiber has a melting point of up to 115° C.

Aspect A5 is the composite of Aspect A2 or A3, wherein the structural polymer portion of the bicomponent fiber has a melting point of at least 240° C. and the binder polymer portion of the bicomponent fiber has a melting point in a range of 100° C. to 190° C.

Aspect A6 is the composite of Aspect A5, wherein the binder polymer portion of the bicomponent fiber has a melting point in a range of 140° C. to 160° C.

Aspect A7 is the composite of any of Aspects A1 to A6, wherein the first bicomponent fiber or the second bicomponent fiber comprises at least two different bicomponent fibers.

Aspect A8 is the composite of any Aspects A1 to A7, wherein the first nonwoven filtration medium comprises 40 wt-% to 60 wt-% of the first bicomponent fiber.

Aspect A9 is the composite of any of Aspects A1 to A8, wherein the second nonwoven filtration medium comprises 40 wt-% to 60 wt-% of the second bicomponent fiber.

Aspect A10 is the composite of any of Aspects A1 to A9, wherein the first large efficiency fiber has a fiber diameter of 2.7 microns.

Aspect 11 is the composite of any of Aspects A1 to A10, wherein the first large efficiency fiber comprises PET.

Aspect A12 is the composite of any of Aspects A1 to A11, wherein the second fiber large efficiency fiber has a fiber diameter of 2.7 microns.

Aspect A13 is the composite of any of Aspects A1 to A12, wherein the second large efficiency fiber comprises PET.

Aspect A14 is the composite of any of Aspects A1 to A13, wherein the first nonwoven filtration medium comprises at least 10 wt-% of the first large efficiency fiber.

Aspect A15 is the composite of any of Aspects A1 to A14, wherein the second nonwoven filtration medium comprises at least 10 wt-% of the second large efficiency fiber.

Aspect A16 is the composite of any of Aspects A1 to A15, wherein a majority of the microfibrillated fibers of the first nonwoven filtration medium have a lateral dimension of up to 2 microns.

Aspect A17 is the composite of any of Aspects A1 to A16, wherein a majority of the microfibrillated fibers of the second nonwoven filtration medium have a lateral dimension of up to 2 microns.

Aspect A18 is the composite of any of Aspects A1 to A17, wherein a majority of the microfibrillated fibers of the first nonwoven filtration medium have a lateral dimension in a range of 0.5 micron to 1.5 microns.

Aspect A19 is the composite of any of Aspects A1 to A18, wherein a majority of the microfibrillated fibers of the second nonwoven filtration medium have a lateral dimension in a range of 0.5 micron to 1.5 microns.

Aspect A20 is the composite of any of Aspects A1 to A19, wherein the first nonwoven filtration medium comprises 10 wt-% to 40 wt % of a microfibrillated fiber.

Aspect A21 is the composite of any of Aspects A1 to A20, wherein the second nonwoven filtration medium comprises 10 wt-% to 40 wt % of a microfibrillated fiber.

Aspect A22 is the composite of any of Aspects A1 to A21, wherein the first nonwoven filtration medium has a solidity in a range of 5% to 15%.

Aspect A23 is the composite of any of Aspects A1 to A22, wherein the first nonwoven filtration medium has a basis weight in a range of 24 g/m$^2$ to 100 g/m$^2$.

Aspect A24 is the composite of any of Aspects A1 to A23, wherein the first nonwoven filtration medium has a pore size of 0.5 micron to 20 microns.

Aspect A25 is the composite of any of Aspects A1 to A24, wherein the first nonwoven filtration medium has a thickness in a range of 0.12 mm to 1 mm.

Aspect A26 is the composite of any of Aspects A1 to A25, wherein the first nonwoven filtration medium has a permeability in a range of 1 ft$^3$/ft$^2$/min at 0.5 inches of water to 100 ft$^3$/ft$^2$/min at 0.5 inches of water.

Aspect A27 is the composite of any of Aspects A1 to A26, wherein the second nonwoven filtration medium has a solidity in a range of 5% to 15%.

Aspect A28. The composite of any of Aspects A1 to A27, wherein the second nonwoven filtration medium has a basis weight in a range of 24 g/m$^2$ to 100 g/m$^2$.

Aspect A29 is the composite of any of Aspects A1 to A28, wherein the second nonwoven filtration medium has a pore size of 0.5 micron to 20 microns.

Aspect A30 is the composite of any of Aspects A1 to A29, wherein the second nonwoven filtration medium has a thickness in a range of 0.12 mm to 1 mm.

Aspect A31 is the composite of any of Aspects A1 to A30, wherein the second nonwoven filtration medium has a permeability in a range of 1 ft$^3$/ft$^2$/min at 0.5 inches of water to 100 ft$^3$/ft$^2$/min at 0.5 inches of water.

Aspect A32 is the composite of any of Aspects A1 to A31, wherein the small efficiency fiber has a fiber diameter of at least 0.4 micron and less than 1 micron.

Aspect A33 is the composite of any of Aspects A1 to A32, wherein the small efficiency fiber has a fiber diameter in a range of 0.6 micron to 0.8 micron.

Aspect A34 is the composite of any of Aspects A1 to A33, wherein the small efficiency fiber comprises a fiber having a fiber diameter of 0.7 micron.

Aspect A35 is the composite of any of Aspects A1 to A34, wherein the small efficiency fiber PET comprises polyethylene terephthalate (PET).

Aspect A36 is the composite of any of Aspects A1 to A35, wherein the composite is substantially free of resin.

Aspect A37 is the composite of any of Aspects A1 to A36, wherein the composite is free of glass fiber.

Aspect A38 is the composite of any of Aspects A1 to A37, wherein the first nonwoven filtration medium, the second nonwoven filtration medium, and the third nonwoven filtration medium are discrete layers.

Aspect A39 is the composite of any of Aspects A1 to A38, wherein the nonwoven filtration medium is configured for a liquid to pass through the first nonwoven filtration medium, then the second nonwoven filtration medium, and then the third nonwoven filtration medium.

Aspect A40 is the composite of any of Aspects A1 to A39, the nonwoven filtration medium further comprising a support layer.

A41 is the composite of Aspect A40, the support layer comprising a porous, polymeric material.

Aspect A42 is the composite of Aspect A40 or A41, wherein the nonwoven filtration medium is configured for a liquid to pass through the first nonwoven filtration medium, then the second nonwoven filtration medium, then the third nonwoven filtration medium, and then the support layer.

Aspect A43 is the composite of any of Aspects A40 to A42, wherein the third nonwoven filtration medium is in contact with the support layer.

Aspect A44 is the composite of any of Aspects A1 to A43, wherein the first nonwoven filtration medium is in contact with the second nonwoven filtration medium, and the second nonwoven filtration medium is in contact with the third nonwoven filtration medium.

Aspect A45 is the composite of any of Aspects A1 to A44, wherein the first large efficiency fiber comprises PET and the PET has a melting point of at least 250° C., at least 275° C., or at least 290° C.

Aspect A46 is the composite of any of Aspects A1 to A45, wherein the second large efficiency fiber comprises PET and the PET has a melting point of at least 250° C., at least 275° C., or at least 290° C.

Aspect A47 is the composite of any of Aspects A1 to A46, wherein the microfibrillated fibers of the first nonwoven filtration medium comprise microfibrillated cellulose fibers.

Aspect A48 is the composite of any of Aspects A1 to A47, wherein the microfibrillated fibers of the second nonwoven filtration medium comprise microfibrillated cellulose fibers.

Exemplary Methods of Using the Composite Aspects

Aspect B1 is a method of filtering a liquid stream, the method comprising passing a liquid stream comprising a contaminant through the composite of any one of the "Exemplary Composite Aspects" (Aspects A1 to A48) and removing the contaminant from the liquid stream. Aspect B2 is the method of Aspect Bl, wherein the liquid stream comprises fuel, hydraulic oil, process water, air, diesel engine fluid (DEF), diesel engine lube oil, or blow-by gas, or a combination thereof.

Aspect B3 is the method of Aspect B1 or B2, wherein a liquid stream passes through the first nonwoven filtration medium, then the second nonwoven filtration medium, then the third nonwoven filtration medium.

Exemplary Methods of Making the Composite Aspects

Aspect C1 is a method of making the composite of any one of the "Exemplary Composite Aspects" (Aspects A1 to A48), the method comprising independently making the first nonwoven filtration medium, the second nonwoven filtration medium, and the third nonwoven filtration medium.

Aspect C2 is the method of Aspect C1, wherein the first nonwoven filtration medium, the second nonwoven filtration medium, and the third nonwoven filtration medium are formed using a wetlaid process.

Aspect C3 is the method of Aspect C1 or C2, the method further comprising placing the first nonwoven filtration medium in contact with the second nonwoven filtration medium, and placing the second nonwoven filtration medium in contact with the third nonwoven filtration medium.

Aspect C4 is the method of Aspect C3, the method further comprising bonding the first nonwoven filtration medium to the second nonwoven filtration medium or bonding the second nonwoven filtration medium to the third nonwoven filtration medium or both.

Aspect C5 is the method of Aspect C4, wherein bonding comprises lamination. Aspect C6 is the method of any of Aspects C1 to C5, the method further comprising placing the third nonwoven filtration medium in contact with a support layer.

The present invention is illustrated by the following examples. It is to be understood that the particular examples, materials, amounts, and procedures are to be interpreted broadly in accordance with the scope and spirit of the invention as set forth herein.

EXAMPLES

All reagents, starting materials, and solvents used in the following examples were purchased from commercial suppliers (such as Sigma Aldrich, St. Louis, MO) and were used without further purification unless otherwise indicated.

Media Characterization

Liquid Filtration Performance Testing

Differential pressure and 4 μm Beta ($\beta_{4\mu m}$) were calculated using a circular flat sheet. Media was tested as described in ISO 16889:2008 (Hydraulic fluid power—Filters—Multi-pass method for evaluating filtration performance of a filter element) except hydraulic fluid was laden with that ISO Fine Test Dust was used instead of ISO Medium Test Dust. The media area was 0.0507 $m^2$; the test flow rate was 2 L/minute, and the test was performed to a terminal element differential pressure of 200 kPa.

Solidity

Solidity (c) of a nonwoven layer (including, for example, a non-fine fiber layer or a composite including fine fiber and non-fine fiber layers) is calculated using the following equation:

$$c=BW/\rho Z$$

where BW is the basis weight, ρ is the density of the fiber, and Z is the thickness of the media.

Thickness was measured according to TAPPI T411 om-15, entitled "Thickness (caliper) of paper, paperboard, and combined board;" a foot pressure of 1.5 psi was used. Basis Weight was measured using TAPPI T410.

Example 1

This Example describes the increased efficiency and life obtained with the use of a composite including a fine fiber layer.

Flatsheets were prepared including a scrim (1 oz/$yd^2$ polyester, sold under the trade name Reemay) and Synteq® 10XP (Donaldson Company, Inc., Minneapolis, MN) overlaid on the scrim (FIG. 2A, left panel), or using the same scrim with a 1 μm-diameter fine fiber electrospun to form a layer thereon and Synteq® 10XP overlaid on the fine fiber layer (FIG. 2A, right panel).

Figure 1B:
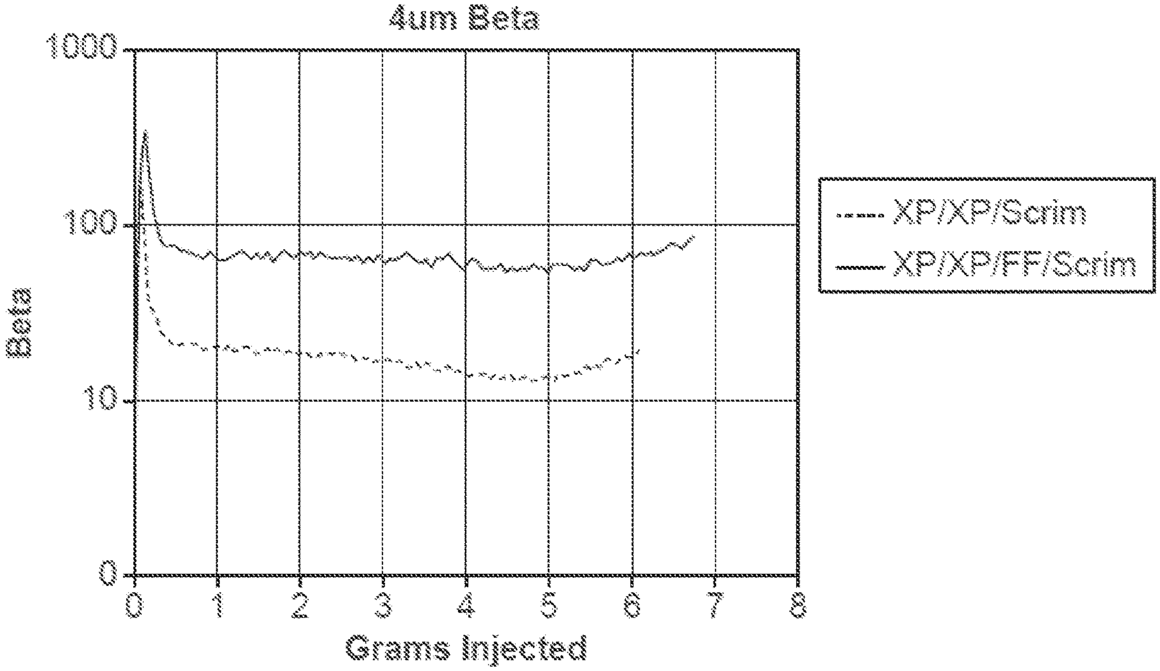
FIG. 1B shows the efficiency of a composite including a fine fiber layer prepared as described in Example 1.

As shown in FIG. 1A, the addition of the fine fiber layer increased the loading capacity (that is, the life) of the flatsheet compared to the flatsheet without the fine fiber layer. As shown in FIG. 1B, the addition of the fine fiber layer increased the efficiency of the flatsheet compared to the flatsheet without the fine fiber layer.

These results were unexpected because it has been previously reported that creating an interface between media layers is undesirable and a gradient structure should be pursued instead. (See, for example, US Publication No. 2014/0360145.)

Without wishing to be bound by theory, it is believed that the creation of an interface between media layers may allow for higher efficiency because the non-uniformities of each layer do not align throughout the depth of the media.

Example 2

The same increases in loading capacity and efficiency reported in Example 1 are expected in a flatsheet including a scrim, a layer of 700 nm-diameter PET fibers, and a handsheet prepared as described in Example 1 including 40%-60% 14 μm-diameter bicomponent fibers, 0-25% 2.5 μm-diameter PET fibers, and 10-40% 1 μm-diameter fibrillated rayon fibers (FIG. 2B).

Without wishing to be bound by theory, it is believed that the layer of 700 nm-diameter PET fibers will act as an efficiency layer, and the handsheet will act as a loading layer. The variable efficiency that would otherwise be observed if the handsheet was used alone is expected to be eliminated by the combination with the 700 nm-diameter PET fibers (acting as an efficiency layer).

Without wishing to be bound by theory, it is believed that the creation of an interface between media layers may allow for higher efficiency because the non-uniformities of each layer do not align throughout the depth of the media.

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A composite comprising a first nonwoven filtration medium acting as a loading layer and comprising:

40 wt-% to 90 wt-% of a first bicomponent fiber having a fiber diameter in a range of 5 microns to 50 microns and a fiber length of 0.1 cm to 15 cm;

10 wt-% to 25 wt % of a first large efficiency fiber having a fiber diameter in a range of 1 micron to 5 microns; and 10 wt-% to 60 wt % of a first microfibrillated fiber, wherein a majority of the microfibrillated fibers have a lateral dimension of up to 4 microns;

a second nonwoven filtration medium acting as a loading layer and comprising:

40 wt-% to 90 wt-% of a second bicomponent fiber having a fiber diameter in a range of 5 microns to 50 microns and a fiber length of 0.1 cm to 15 cm;

10 wt-% to 25 wt % of a second large efficiency fiber having a fiber diameter in a range of 1 micron to 5 microns; and 10 wt-% to 60 wt % of a second microfibrillated fiber, wherein a majority of the microfibrillated fibers have a lateral dimension of up to 4 microns;

a third nonwoven filtration medium acting as an efficiency layer and comprising a small efficiency fiber having a fiber diameter of at least 0.1 micron and less than 1 micron; and a support layer, wherein the first nonwoven filtration medium is the upstream-most layer and the third nonwoven filtration medium is disposed between the first nonwoven filtration medium and the support layer, wherein the first nonwoven filtration medium, the second nonwoven filtration medium, and the third nonwoven filtration medium are discrete layers, wherein the first nonwoven filtration medium has a thickness in a range of 0.12 mm to 1 mm and the second nonwoven filtration medium has a thickness in a range of 0.12 mm to 1 mm, and wherein the composite is substantially free of glass fiber.

2. The composite of claim 1, wherein the bicomponent fiber comprises a structural polymer portion and a binder polymer portion, and wherein the structural polymer portion of the bicomponent fiber has a melting point of at least 240° C. and the binder polymer portion of the bicomponent fiber has a melting point in a range of 100° C. to 190° C.

3. The composite of claim 1, wherein the first large efficiency fiber comprises polyethylene terephthalate (PET), or wherein the second large efficiency fiber comprises PET or both.

4. The composite of claim 1, wherein the small efficiency fiber has a fiber diameter in a range of 0.6 micron to 0.8 micron.

5. The composite of claim 1, wherein the small efficiency fiber comprises polyethylene terephthalate (PET).

6. The composite of claim 1, wherein the composite is substantially free of resin.

7. The composite of claim 1, wherein the composite is free of glass fiber.

8. The composite of claim 1, wherein the nonwoven filtration medium is configured for a liquid to pass through the first nonwoven filtration medium, then the second nonwoven filtration medium, and then the third nonwoven filtration medium.

9. The composite of claim 1, wherein the third nonwoven filtration medium is in contact with the support layer.

10. The composite of claim 1, wherein the microfibrillated fibers comprise microfibrillated cellulose fibers.

11. A method of filtering a liquid stream, the method comprising passing a liquid stream comprising a contaminant through the composite of claim 1, and removing the contaminant from the liquid stream.

12. The method of claim 11, wherein the liquid stream comprises air.

13. A method of making the composite of claim 1, the method comprising independently making the first nonwoven filtration medium, the second nonwoven filtration medium, and the third nonwoven filtration medium.

14. The composite of claim 1, wherein the second nonwoven filtration medium is disposed between the first nonwoven filtration medium and the third nonwoven filtration medium.

15. The composite of claim 1, wherein the composite is configured for filtering hydraulic fluid or fuel.

* * * * *